United States Patent [19]

Brownlee

[11] 4,343,762

[45] Aug. 10, 1982

[54] SAFETY DEVICE FOR NUCLEAR FISSION REACTORS

[76] Inventor: Morris L. Brownlee, 4728 Jefferson Hwy., Jefferson, La. 70121

[21] Appl. No.: 163,593

[22] Filed: Jun. 27, 1980

[51] Int. Cl.$^3$ .............................................. G21C 9/00
[52] U.S. Cl. .................................................. 376/280
[58] Field of Search .................... 176/37, 38; 376/280, 376/264

[56] References Cited

U.S. PATENT DOCUMENTS

| | | | |
|---|---|---|---|
| 3,945,883 | 3/1976 | Hind et al. ............................. | 176/38 |
| 4,003,785 | 1/1977 | Rau et al. ............................... | 176/38 |
| 4,045,284 | 8/1977 | Rosewell ............................... | 176/38 |
| 4,146,429 | 3/1979 | Slagley ................................... | 176/38 |

FOREIGN PATENT DOCUMENTS

| | | | |
|---|---|---|---|
| 2622050 | 5/1976 | Fed. Rep. of Germany ........ | 176/38 |
| 958088 | 5/1964 | United Kingdom .................. | 176/38 |

*Primary Examiner*—Richard E. Schafer
*Assistant Examiner*—Edward T. Miles
*Attorney, Agent, or Firm*—James B. Lake, Jr.

[57] ABSTRACT

A plurality of radially arranged and neutron absorbing baffles are stacked in vertical sets under the fuel core assemblies, and the whole enclosed in a bottle shaped containment vessel. The radially arranged baffles of each set extend vertically, and each set has double the number of baffles as the set above it in the stack. A melt-down of a fuel core assembly drops the fissioning nuclear fuel into the stacked sets of baffles, there, as it passes through, to be progressively divided, redivided and dispersed in smaller and smaller masses between the doubling number of baffles in safe fuel pellet size. Neutron absorbing containment prevents contamination of the environment and together with cooling means stops fissioning of fuel.

5 Claims, 3 Drawing Figures

SAFETY DEVICE FOR NUCLEAR FISSION REACTORS

BACKGROUND OF THE INVENTION

The invention relates generally to nuclear fission reactors, and more particularly to a safety device for dividing a critical mass of fissioning nuclear fuel with neutron absorbing baffles into a plurality of less than critical masses to stop fissioning, and containing the dispersed masses and radioactive products against escape from the reactor and into the environment.

No search of this sensitive art has been made, and the inventor does not know of any prior art.

SUMMARY OF THE INVENTION

It is an object of the invention to provide a safety device for stopping the fissioning of a nuclear fuel core and containing the radioactive products in a melt-down of said nuclear fuel core.

DETAILED DESCRIPTION OF THE PREFERRED EMBODIMENT

Figure 1:
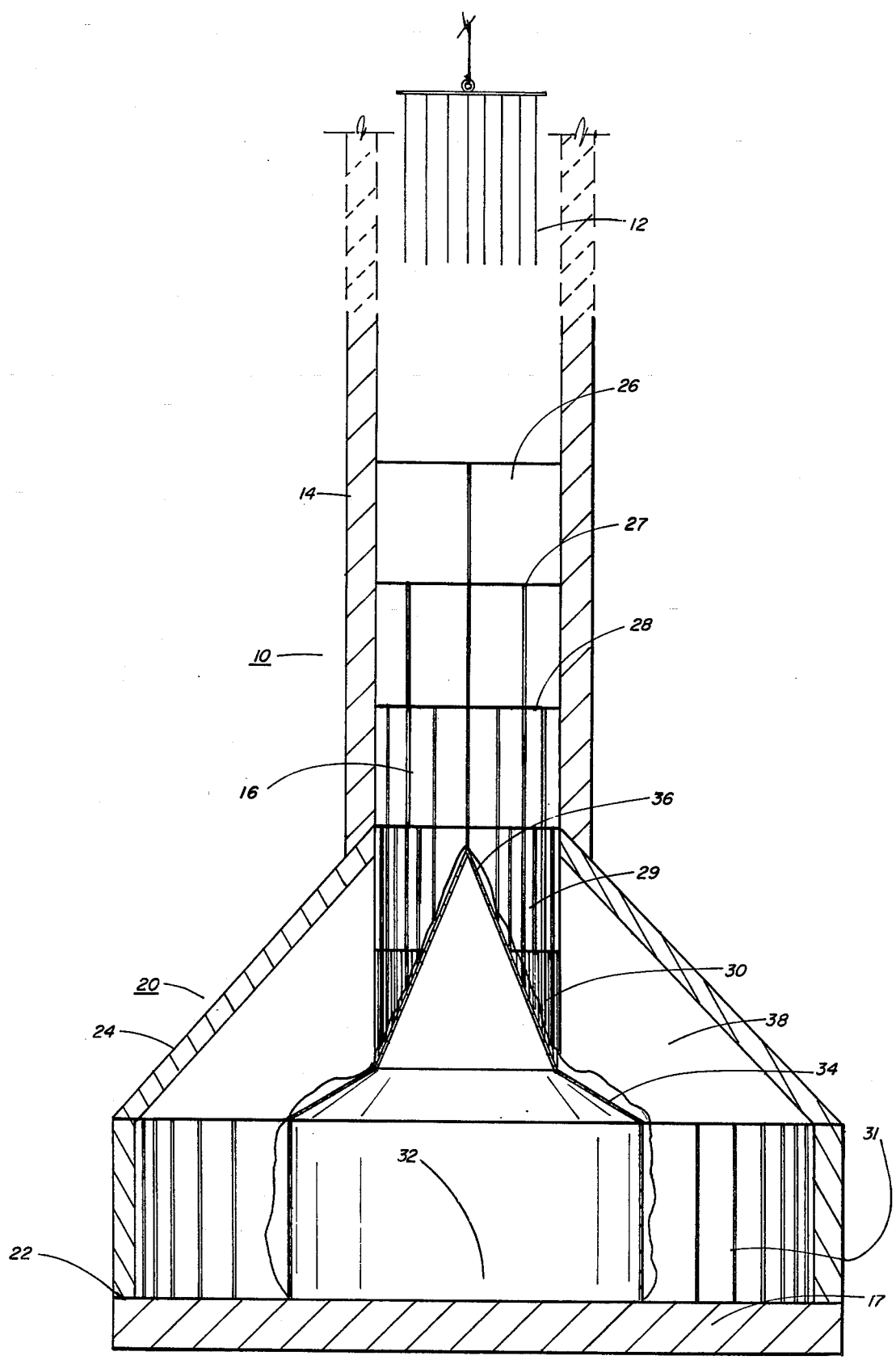
FIG. 1 is a vertical cross-sectional view of the invention mounted below a nuclear fuel core assembly.

Referring to FIG. 1, the invention comprises a tungsten reinforced, refractory ceramic bottle 10. A fuel core assembly 12 is suspended in the top of neck 14 of bottle 10. A vertical array of baffle sets 16 extends from under the fuel core assembly to the base 17 of said bottle 10. Beginning with a first baffle set 26, the next with 2 or 3 baffles 19 and each baffle set therebelow has double the number of baffles as the one immediately above it (see FIGS. 2 or 3). The number of baffle sets 16 is determined by the amount of nuclear fuel in the core assembly 12 so as to divide it into the relatively safe fuel pellet masses in which nuclear fuel is shipped.

Bottle 10 comprises a body 20 having a cylindrical lower part 22 and frustoconical upper part 24 fixed to the neck 14. Baffle sets 16 are supported and arranged in bottle 10 as shown in FIG. 1, with three baffle sets 26–28 supported in bottle neck 14, and three baffle sets 29–31 supported in the bottle body 20 on base 17, and which support neck baffle sets 26–28. All of the baffle sets 16 are cylindrical except for baffle set 31 which is annular in shape to define a center space 32 in which a heat exchanger (not shown) may be mounted. An impact plate 34 covers space 32 which is greater in diameter than the remainder of the baffle sets, and thus slopes upwardly to a center cone 36 that extends from the impact plate upwardly into baffle sets 30 and 29 which are adapted to engage therearound. Space 38, defined in the conical upper part 24 of bottle 10 by bottle baffle sets 29–30, center cone 36, and impact plate 34, provides for gas expansion and containment of radioactive gas products of the melt-down.

Figure 2:
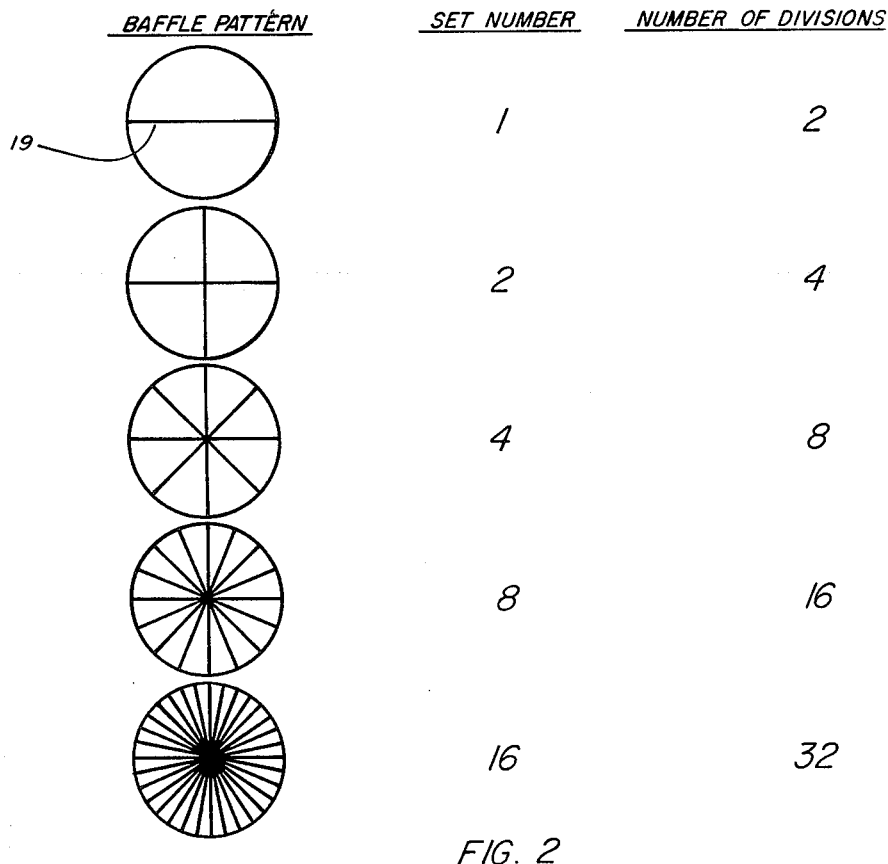
FIG. 2 is a plan view of a plurality of baffle sets showing the number of baffles in a succession of sets wherein the first baffle set has one baffle, with succeeding sets having double the number of set above.
Figure 3:
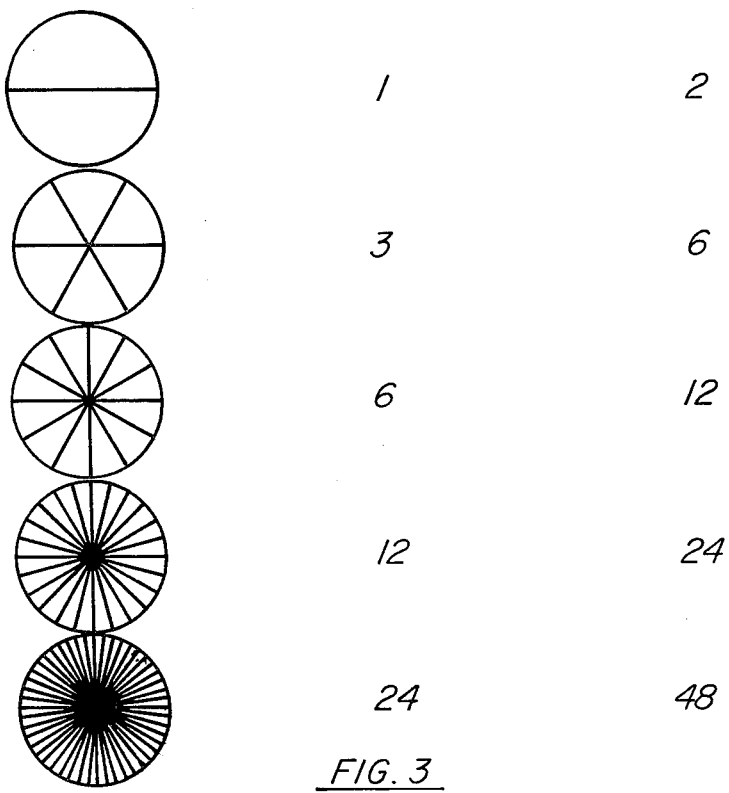
FIG. 3 is similar to FIG. 2 but with first baffle set having one baffle, the next three and succeeding sets double the number of set above.

Referring to FIGS. 2 and 3, the second baffle set 27 can be comprised of two or three baffles, depending on the available space and the mass of nuclear fuel in the core assembly. By doubling the number of baffles 19 begining with one baffle in the baffle set 29, there will be 32 baffles in set 31. If upper set 27 begins with three baffles, then lower set 31 will have 48 baffles in the same number of sets below.

In use, the invention functions to divide a melt-down mass of nuclear fuel into twice the number of masses for each set of baffles, at least, thru which it passes, thereby rapidly reducing the separate masses to below criticality and fissioning, and at the same time to absorb neutrons necessary for chain reaction fissioning. Expansion for radioactive gaseous products is provide in space 38, and cooling is provided in space 32. Thus all radioactive products of a melt-down are contained in bottle 10 and prevented from contaminating the environment, and fission of nuclear fuel is halted by division into less than critical masses halted prior to a nuclear explosion.

It should be noted that center cone 36 and impact plate 34 direct the melt outwardly and downwardly into the most multitudinous baffles of the bottom annular baffle set 31.

I claim:

1. A safety device for a nuclear fission reactor having suspended fuel assembly cores and comprising:
   (a) a bottle positioned in said reactor to receive a fuel assembly core in its neck;
   (b) a plurality of bottle neck baffle sets mounted in vertical, congruent succession in said bottle neck, each set having a multiple of the number of baffles of the set immediately above it for progressively and unblockably dividing the critical mass of the fuel assembly core into less than critical masses as they pass through said sets; and
   (c) a plurality of bottle body baffle sets mounted in said bottle body and in alignment with said bottle neck baffle sets, the upper body baffle set being congruent to the lower of said bottle neck baffle sets, and being engaged with around a center cone for dispersing said divided mass of the fuel assembly core outwardly and downwardly into a gas expansion space and thence into an annular lower body baffle set supported on the base of said bottle.

2. A safety device as described in claim 1 wherein the baffles of said bottle neck baffle sets are center connected intersecting vertically, and extend radially outwardly to contact said bottle neck, and each of said sets doubles the spaces between its baffles and those of set above it, all said baffles being neutron absorbent.

3. A safety device as described in claim 1 wherein said upper body baffle sets are supported on an impact plate and define with it and the bottle body said gas expansion space therebetween.

4. A safety device as described in claim 1 wherein said annular lower body baffle set defines with said impact plate and the base of said bottle a center space for an installation of a heat exchanger if required.

5. A safety device as described in claim 1 wherein said plurality of bottle body baffle sets has double the baffles of the baffle set above it.

* * * * *